United States Patent Office 3,519,277
Patented July 7, 1970

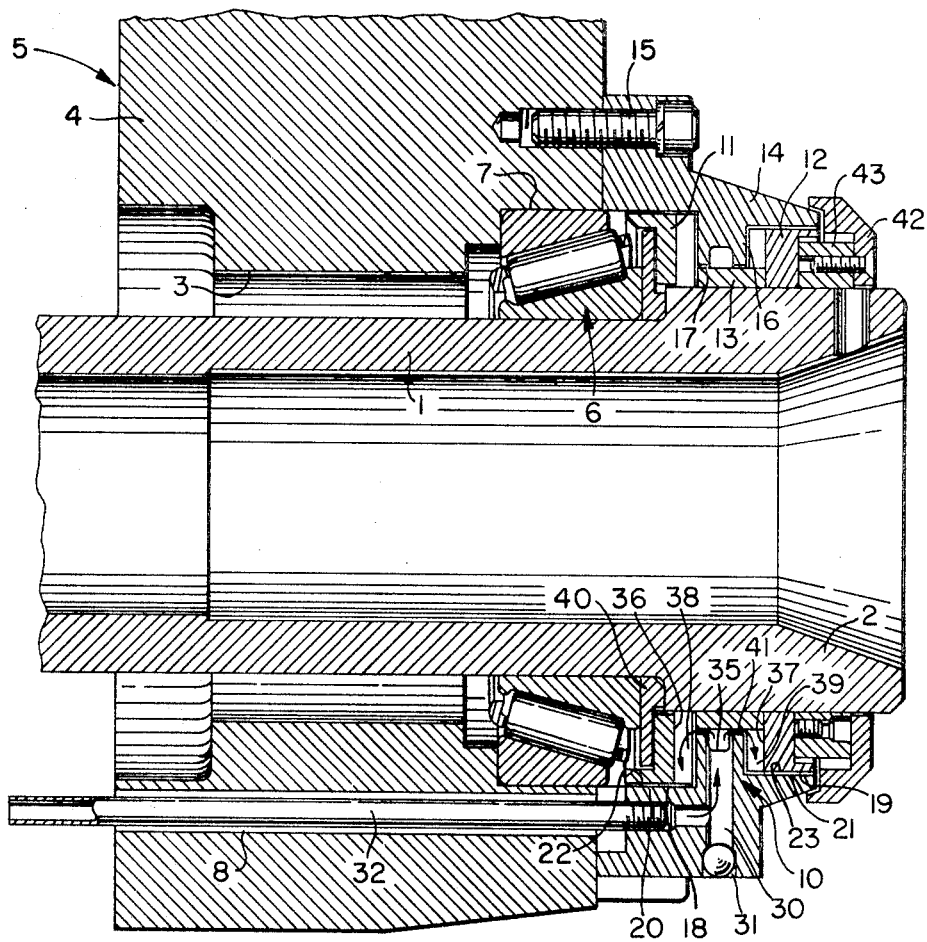
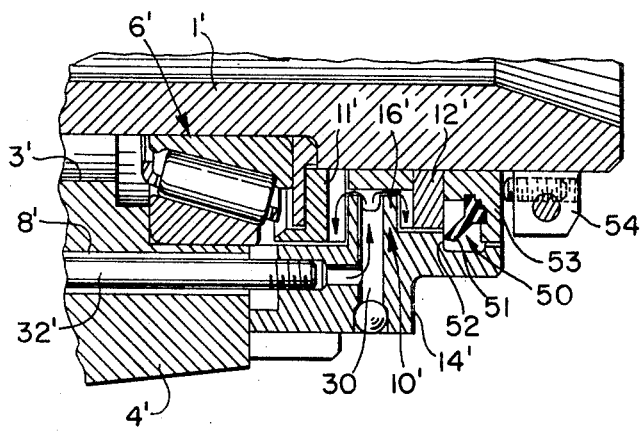

3,519,277
FAN SEAL
Weyman S. Crocker, Springfield, Vt., assignor to
Pneumo Dynamics Corporation, Cleveland, Ohio,
a corporation of Delaware
Filed Jan. 18, 1968, Ser. No. 698,839
Int. Cl. F16j 15/40
U.S. Cl. 277—25                                     19 Claims

ABSTRACT OF THE DISCLOSURE

A fan seal including a pair of axially spaced apart fans mounted for rotation with a spindle or shaft, the inner fan being adapted to direct air through an inner labyrinth packing between the shaft and a housing surrounding the same to the interior of the housing to prevent the escape of lubricant therefrom, and the outer fan being adapted to direct air in the opposite direction outwardly through an outer labyrinth packing for preventing the entrance of coolant and the like into the housing. A vent between the fans provides sufficient air for the fans to permit the creation of high static heads.

BACKGROUND OF THE INVENTION

The present invention relates generally as indicated to a fan seal and more particularly to certain improvements in fan seals for machine tool spindles and the like.

Fan seals of various types have long been used in association with labyrinth packings between a rotating and stationary member to create a pressure head in the packings in a direction tending either to keep dust particles and coolant out or retain lubricant for the bearings within a housing, but generally not in both directions. Thus, depending on which type of fan seal was being used, there was always the danger of coolant or lubricant leaking into or out of the housing. The seal selected would depend upon the relative importance of keeping lubricant in and coolant out for a particular application, but it is often desirable to eliminate leakage in both directions.

SUMMARY OF THE INVENTION

With the fan seal of the present invention, leakage in both directions, that is, loss of lubricant from the housing and entry of dust or coolant into the housing, is substantially eliminated by providing a pair of fan seals, one for directing air through an inner labyrinth packing to the interior of the housing to prevent the escape of lubricant therethrough, and the other for directing air through an outer labyrinth packing to the atmosphere for preventing the entrance of coolant into the housing, this being a principal object of this invention.

Another object is to provide a dual fan arrangement of the type described in which the fans are in closely axially spaced relation on a rotatable member for rotation therewith, and there is a vent intermediate the fans to provide sufficient air for the fans to preclude the formation of a partial vacuum therebetween.

Still another object is to provide such a fan seal in combination with a sill for preventing leakage of lubricant and/or coolant thereover when the rotatable member is at a standstill.

A further object is to provide such a fan seal in combination with a deflector or static seal on the outer end of the rotatable member to preclude flow of coolant into the outer labyrinth packing when the rotatable member is stationary.

Yet another object is to provide a fan seal of the type described which is long lived, relatively inexpensive to manufacture, and consumes very little power when in operation.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but few of the various ways in which the principles of the invention may be employed.

BRIEF DESCRIPTION OF THE DRAWING

In the annexed drawing:

FIG. 1 is a fragmentary longitudinal section through one end of a spindle shown journaled in a housing and having a preferred form of fan seal in accordance with this invention interposed between the spindle and housing, with a deflector attached to the end of the spindle; and FIG. 2 is a fragmentary longitudinal section similar to FIG. 1, but a static seal has been substituted for the deflector.

DESCRIPTION OF THE PREFERRED EMBODIMENTS

Referring now in detail to the drawing and first especially to FIG. 1, there is shown by way of example a rotatable member such as a shaft or spindle 1 having one end 2 projecting outwardly through a bore 3 in the wall 4 of a machine tool housing 5 or the like for mounting of a machine tool thereon in conventional manner. The spindle 1 may be journaled in the bore 3 as by means of a roller bearing 6 received in a counterbore 7 in the housing 5. To ensure proper lubrication of the bearing 6, lubricating oil may be pumped through the clearance between the wall of the bore 3 and spindle 1 for circulation through the bearing 6 and return to a reservoir (not shown) via a plurality of drainage holes 8 in the housing 5.

Both leakage of lubricant from the interior of the housing 5 and the entrance of dust particles and coolant which may be directed against the tool held by the spindle 1 is precluded by providing a fan seal 10 in accordance with this invention on the outer end of the spindle 1. As shown, the fan seal 10 desirably consists of a pair of axially spaced apart fans 11 and 12 suitably mounted on the outer end of the spindle 1 for rotation therewith and separated by a spacer element 13. Surrounding the fans 11 and 12 and spacer element 13 is a nose cover 14 which forms part of the machine tool housing 5 and may be secured to such housing as by means of suitable fasteners 15.

The nose cover 14 has a radial flange 16 projecting radially inwardly between the fans 11 and 12 to provide a slight clearance 17 with the spacer element 13 for a purpose to be subsequently explained, and there are smaller clearances 18 and 19 between the cylindrical outer peripheries 22 and 23 of the fans 11 and 12 and the adjacent inner cylindrical surfaces 20 and 21 of the nose cover 14 defining labyrinth packings therebetween which have direct communication with the interior and exterior for minimizing the extent to which coolant and lubricant may pass between these adjacent surfaces into and out of the interior of the housing 5. In addition, an inward and outward flow of air is directed at the inner and outer labyrinth packings 18 and 19, respectively, by the associated inner and outer fans 11 and 12 during rotation of the spindle 1 to create a flow of air in opposite directions through the inner and outer labyrinth packings to the interior and exterior of the housing, respectively, to provide a static pressure head which completely eliminates the passage of lubricant and coolant through the packings.

Sufficient air may be supplied to the fans 11 and 12 through a radial vent passage 30 in the flange 16 of the nose cover 14, which vent passage may open directly to the atmosphere, or if that is not practical because of dust and the like in the air adjacent the outer end of the spindle, the vent passage 30 may be plugged at its outer end as shown at 31 and connected inwardly of the plug 31 to a copper vent tube 32 which may extend from the rear and be conveniently disposed in one of the drainage holes 8 in the housing 5. If not properly vented, a vacuum will be created at the suction ends of the fans 11 and 12, whereby the net gain in static head over atmospheric pressure will be quite small, and consequently drops of lubricant may splash out and coolant spatter into the lubricant. Accordingly, the fans 11 and 12 should be vented around the entire circumference of the spindle 1 as by providing an annular groove 35 either in the nose cover 14 as shown or in the spacer ring 13. The depth of the groove 35 should be 1/8 inch minimum and preferably 1/4 inch to provide adequate venting.

As the fans 11 and 12 rotate, air is forced radially outwardly, thereby producing a static head adjacent each labyrinth packing 18 and 19 tending to cause a flow of air therethrough opposing the normal direction of flow of oil and coolant through the packings. In some applications the static head created by the opposed flat faces 36 and 37 of the fans 11 and 12 may be sufficient, but for most applications it is preferred to develop as high a static head as possible, and accordingly, plural blades 38 and 39 are generally provided on such faces 36 and 37. The fan blades 38 and 39 are necessarily very short radially and narrow because of space limitations, and yet it has been found that by using thirty-six blades with a backward slant of from 15° to 22½°, a six inch head can be produced at 1800 r.p.m.

The labyrinth packings 18 and 19 must likewise be relatively short due to space limitations. However, where the spindle is from 3 to 5 inches in diameter, the packings should be at least about .250 inch long. If shorter than that, air may find its way into the oil, causing bubbles and foam in the oil filter. Similarly, the inner labyrinth 18 should be a small clearance of from about .005 to .010 inch. If larger than that, oil may be allowed to splatter outwards, whereas if the clearance is much smaller, fan stall may occur, a condition which results in seal leaks, probably due to air or oil in the labyrinth packing becoming turbulent and causing the static head to fall off due to loss of the oil film by the turbulence. Smaller clearances can be tolerated without causing fan stall if the speed of rotation of the fans is increased or the fans are slightly eccentrically mounted. As an example, at 1750 r.p.m. the minimum clearance is approximate .003 inch. However, if the fan is disposed eccentrically by .001 inch, a clearance of .002 inch can be tolerated without fan stall.

Another factor which contributes to fan stall is the width and thickness of the blades. A fan blade section should be as thin as possible, since if the outer radius and flanks of the fan blades are too wide and the blade section is relatively thick, fan stall will occur sooner. A 1/4 inch section has been found to be satisfactory.

The outer labyrinth packing 19 may be substantially identical to the inner labyrinth packing 18 except that when water soluble coolants are used, a clearance of approximately 1.7 times less than for oil should be used, since water soluble coolants have a viscosity to density ratio which is approximately five times less than the lightest lubricant.

During rotation of the spindle 1, the air flow through the inner and outer labyrinth packings 18 and 19 caused by the fans 11 and 12 is quite small because of the narrow clearance of the labyrinth packings, thus resulting in a relatively high static pressure in the labyrinth packings which opposes the flow of oil and coolant therethrough. If oil or coolant should work its way into the labyrinth packings 18 or 19 when the spindle 1 is at rest, the liquid will immediately be hurled back out in a few turns of the spindle, after which the fan seal 10 will run dry except for a thin oil film on the inner labyrinth packing 18. A slinger 40 of conventional type may be mounted on the spindle 1 intermediate the bearing 6 and inner fan 11 to assist in keeping lubricant away from the inner labyrinth packing 18.

Even when the spindle 1 is at rest and there is no static head created by the fans 11 and 12 opposing the flow of lubricant through the labyrinth packing 18, leakage cannot occur over the sill 41 which is formed by the inner edge of the radial flange 16, that is, not unless the head of oil is higher than the sill, but this is not likely to occur with a plurality of equally spaced drain holes 8 around the periphery of the bearing. Although the number of such drain holes may be varied, it is preferred that six such drain holes be provided, and that one communicate directly with the main drive shaft.

Coolant is also precluded from entering the interior of the housing through the labyrinth packing 19 when the spindle is at rest by the sill 41, but it may travel into such packing 19 and cause damage thereto. Accordingly, it is preferred that a coolant deflector 42 be mounted on the outer end of the spindle 1 in overlying relation with the outer end of the nose cover 14 to deflect coolant away from the labyrinth packing 19 regardless of the direction of impingement of the coolant. The deflector 42 may be secured to the spindle 1 by attaching the same to a clamp ring 43 suitably clamped to the spindle.

In place of the deflector 42, a centrifugal static seal such as shown at 50 in FIG. 2 may be used, provided with a rubber or rubber-like lip 51 which is in sealing contact with an annular shoulder 52 of the nose cover 14' when the spindle 1 is at rest or rotating slow speeds to preclude entry of coolant into the outer labyrinth packing 19'. At increased speeds of the spindle 1 to approximately 150 r.p.m. and above, the rubber lip 51 is lifted out of engagement with the annular shoulder 52 by centrifugal force to eliminate excess friction and prolong the life of the lip 51, since the rubber seal is not needed when the outer fan 12' is creating an outward flow of air through the outer labyrinth packing 19' in the manner previously described. The static seal 50 may be carried by a metal sleeve 53 telescoped over the end of the spindle 1 and clamped in place by a split ring 54. Otherwise, the construction of the machine tool housing 4' and fan seal 10' of FIG. 2 is substantially identical to that shown in FIG. 1, and accordingly the same reference numerals followed by a prime symbol are used to designate like parts.

From the above discussion, it can now be seen that the fan seal of the present invention is of a relatively simple and unique construction which is relatively inexpensive to manufacture and yet is very effective in keeping lubricant in and coolant out by providing a double fan arrangement that produces both inward and outward flow of air through associated labyrinth packings. Moreover, because there are substantially no contacting parts, the fan seal has an extremely long life, and consumes very little power during use.

Other modes of applying the principles of the invention may be employed, change being made as regards the details described, provided the features stated in any of the following claims or the equivalent of such be employed.

I, therefore, particularly point out and distinctly claim as my invention:

1. A seal between a housing and a shaft projecting through a bore in a wall of said housing comprising a pair of axially spaced apart inner and outer labyrinth packings between said housing wall and said shaft having direct communication with the interior and exterior of said housing, respectively, and fan means mounted on said shaft for rotation therewith to create a flow of air in opposite directions through said inner and outer labyrinth packings to the interior and exterior of said housing, respectively, for providing a static pressure head preventing the passage of lubricant and coolant through said packings.

2. The seal of claim 1 wherein said fan means comprises a pair of axially spaced apart fans, the inner one of said fans causing an axial inward flow of air through said inner labyrinth packing into the interior of said housing and the outer one of said fans causing an axial outward flow of air through said outer labyrinth packing to the exterior during rotation of said shaft.

3. The seal of claim 2 further comprising a spacer element separating said fans and vent means in said housing intermediate said fans for supplying sufficient air to said fans to preclude the formation of a partial vacuum at the suction end of said fans.

4. The seal of claim 2 wherein said fans have plural blades on their opposed faces for developing a high static head in the associated labyrinth packings.

5. The seal of claim 4 wherein said blades have a backward slant of from 15° to 22½°.

6. The seal of claim 4 wherein said fans are slightly eccentrically mounted on said shaft and said packings are formed by providing a clearance of approximately .002 inch.

7. The seal of claim 4 wherein said inner packing is formed by providing a clearance of from .005 to .010 inch, and said outer packing is formed by providing a clearance approximately 1.7 times less than the clearance for said inner packing.

8. The seal of claim 4 wherein said packings are at least .25 inch long.

9. The seal of claim 1 further comprising a sill means between said fans for preventing leakage of coolant and lubricant into and out of said housing through said packings when said fans are at rest.

10. The seal of claim 1 further comprising a deflector means on said shaft in overlying relationship with said outer packing for deflecting coolant away therefrom regardless of the direction of impingement of the coolant, thereby preventing coolant from entering said outer packing when said fans are at rest.

11. The seal of claim 1 further comprising a centrifugal static seal means mounted on said shaft in sealing engagement with soid housing to preclude entry of coolant into said outer packing when said fans are at rest, said seal means being adapted to be lifted out of engagement with said housing by centrifugal force during rotation of said shaft to eliminate excess friction and thus prolong the life of said seal means.

12. A seal between a housing and a shaft projecting through a bore in a wall of said housing comprising a pair of axially spaced apart inner and outer fans mounted on said shaft for rotation therewith outwardly adjacent said wall, and a nose cover secured to said wall surrounding said shaft and fans, said nose cover defining with portions of said inner and outer fans axial inner and outer labyrinth packings having direct communication with the interior and exterior of said housing, respectively, for minimizing the passage of coolant and lubricant into and out of the interior of said housing, said inner and outer fans during rotation of said shaft causing a flow of air in opposite directions through said inner and outer labyrinth packings to the interior and exterior of said housing, respectively, for creating a static pressure head in the adjacent labyrinth packings which completely eliminates the passage of coolant and lubricant therethrough, and vent means in said nose cover between said fans for supplying sufficient air to prevent the formation of a partial vacuum at the suction end of said fans.

13. The seal of claim 12 wherein said vent means extends around the entire circumference of said shaft and there is a passage in said nose cover communicating said vent means with the atmosphere.

14. The seal of claim 13 further comprising a vent tube extending through said housing and communicating with said passage in said nose cover, said vent tube being contained in an oil drainage passage in said housing.

15. The seal of claim 12 further comprising a sill means between said inner and outer packings for preventing leakage of coolant and lubricant into and out of said housing through said packings when said fans are at rest, and a plurality of equally spaced oil drainage passages communicating with the interior of said housing to maintain the head of oil less than the height of said sill.

16. The seal of claim 15 wherein said sill means comprises a radial flange on said nose cover projecting radially inwardly between said fans to provide a slight clearance with the adjacent surface of said shaft.

17. The seal of claim 12 further comprising a deflector means on said shaft in overlying relationship with said outer packing for deflecting coolant away therefrom regardless of the direction of impingement of the coolant, thereby preventing coolant from entering said outer packing when said shaft is at rest.

18. The seal of claim 12 further comprising a centrifugal static seal means mounted on said shaft in sealing engagement with a shoulder of said nose cover outwardly of said outer packing to prevent entry of collant into said outer packing when shaft is at rest, said seal means being lifted out of engagement with said nose cover by centrifugal force during rotation of said shaft to eliminate excess friction and to prolong the life of said seal means.

19. The seal of claim 12 further comprising a slinger mounting on said shaft inwardly of said inner packing to assist in keeping oil away from said inner packing during rotation of said shaft.

References Cited

UNITED STATES PATENTS

| | | | |
|---|---|---|---|
| 1,394,959 | 10/1921 | Wilkinson | 277—133 X |
| 2,198,782 | 4/1940 | May | 277—53 X |

SAMUEL ROTHBERG, Primary Examiner

U.S. Cl. X.R.

277—63, 67